UNITED STATES PATENT OFFICE.

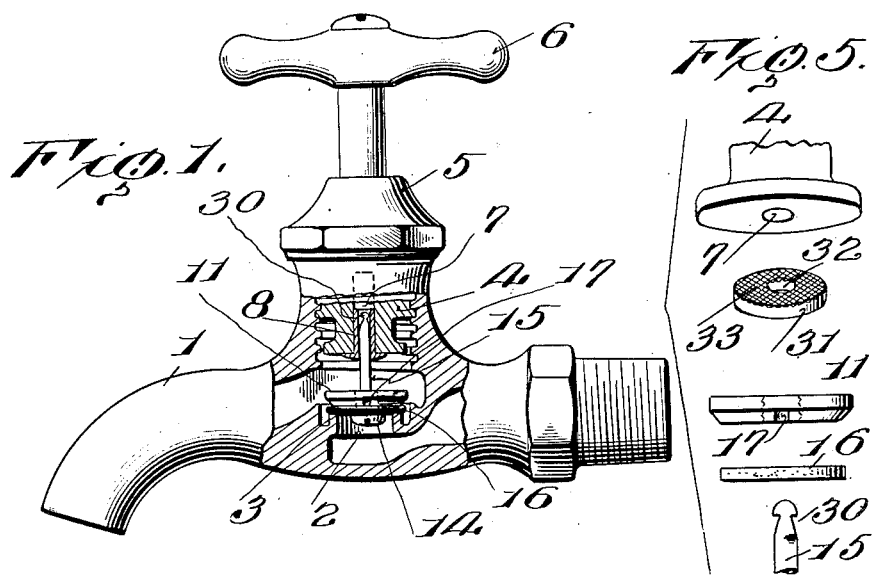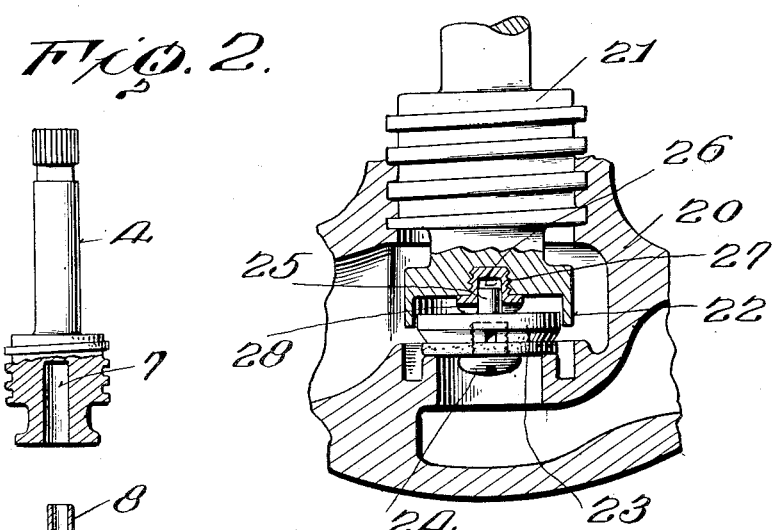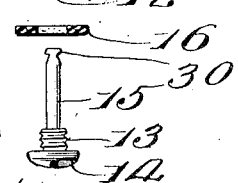

MATTHEW S. REILEY, OF CALGARY, ALBERTA, CANADA.

VALVE.

1,322,200.                    Specification of Letters Patent.        Patented Nov. 18, 1919.

Application filed October 8, 1918. Serial No. 257,376.

*To all whom it may concern:*

Be it known that I, MATTHEW S. REILEY, a citizen of the United States, residing at Calgary, in the Province of Alberta, Dominion of Canada, have invented certain new and useful Improvements in Valves, of which the following is a specification.

My invention has for its object the provision of means whereby the wear upon the washers of ordinary faucets may be minimized and the valve firmly held to its seat so as to effectually close the faucet.

The invention is illustrated in the accompanying drawings and will be hereinafter fully described, the novel features being subsequently pointed out in the appended claims.

In the drawings—

Figure 1 is a view, partly in elevation and partly in longitudinal section, of a faucet having my improved valve applied thereto;

Fig. 2 is a view showing the several parts of the valve in section and separated but in their approximate relative positions;

Fig. 3 is a detail perspective view of the nut or base upon which the washer is carried;

Fig. 4 is a sectional elevation showing a slightly different application of the invention;

Fig. 5 is a view similar to Fig. 2 showing a further development of the invention.

The faucet 1 comprises a body of well-known construction having a port 2 therein formed through the valve seat 3. A valve operating shank 4 is threaded into the body of the faucet and is normally held against complete withdrawal by a bonnet 5 which is mounted upon the top of the body around the shank in the usual manner. Above the bonnet the shank is equipped with the usual handle 6. In the inner or lower end of the shank 4, I form a longitudinal socket or bore 7 which receives a thimble 8 which may be secured in the inner end of the bore in any desired manner. In Fig. 1, I have shown this thimble as of such diameter that when it is forced into the bore 7 it will be securely held therein by its frictional engagement with the wall of the bore. At its inner end, the thimble 8 is constructed with a laterally enlarged head 9 and the lower surface of the said head is preferably convex, as shown at 10. The upper flat surface of the head 9 by impinging against the flat inner end of the shank limits the insertion of the thimble into the shank and also serves to effect a firm engagement between the head and the end of the shank so that the pressure exerted by the liquid through the valve will be received by the head and the engagement of the head and the valve will hold the valve firmly to its seat. The convex surface 10 of the head 9 minimizes the area of contact between the valve and the head and consequently reduces wear upon the contacting parts and permits a slight rocking of the valve relative to the shank so that the valve will be squarely seated when closed. The valve comprises a lock nut or base 11 having a central threaded opening 12 to receive the threaded body 13 of the washer-retaining screw, the said screw having a head 14 and an elongated smooth spindle or stem 15. A washer 16 of rubber or other elastic material is fitted against the under side of the base or nut 11 and is held thereto by the head 14 of the retaining screw, it being understood that the said screw passes through the central opening of the washer and engages the threaded bore of the nut with the stem or spindle 15 passing into the thimble 8, as shown in Fig. 1. It will be readily noted that by this arrangement the spindle will have sliding engagement with the thimble and merely fits loosely therein so that the rotation of the shank will not be transmitted to the valve which will remain relatively stationary but the valve may move axially of the shank and will so move under the pressure of the liquid when the shank is rotated so as to rise within the faucet body. When the shank is rotated in the opposite direction, the pressure of the liquid will hold the valve against the under surface of the head 9 and the inward movement of the shank will, therefore, force the valve to its seat and the valve will be held firmly to its seat, but after being fully closed the continued rotation of the shank will not impart any movement to the valve although it may serve to compress the elastic washer. Inasmuch as no rotary motion will be imparted to the washer it will not be caused to grind upon its seat and, consequently, will not be cut through so that it will not wear away as quickly as in faucets now in common use. It is to be understood that the movement of the valve is independent of the movement of the shank and is due primarily to its own weight and the pressure of the fluid within the valve body. If the flow of fluid be cut-off so that no pressure will be exerted by it, the valve will remain seated even though the shank be rotated to rise within the valve body and the shank may, therefore, be entirely withdrawn and leave the valve seated and in the closing or opening movement the valve will not rotate but will simply move in a rectilinear path along its axis. After the valve is seated the continued rotation of the shank might ordinarily effect slight rotation of the valve but by my invention this movement of the valve and the consequent wear upon the washer or packing member of the valve is avoided inasmuch as the interposition of the wear-resisting element will reduce the area of contact between the end of the shank and the valve to such an extent so that no rotary movement will be imparted to the valve but the elastic member thereof will be slightly compressed so as to cut-off the flow of fluid.

While the washers with my improved construction will wear for an indefinite period, the quality of the washers obtained in the open market is not uniform and it sometimes happens that washers disintegrate so that a new washer must be applied even in faucets embodying my invention. When the provision of a new washer is necessary, the bonnet 5 is withdrawn from the faucet body to permit entire withdrawal of the shank after which the valve may be easily lifted from the faucet by the use of a pair of pliers having narrow jaws, or a loop of thread or wire may be engaged in notches 30 provided near the upper end of the stem or spindle and the valve readily withdrawn. Inasmuch as the valve does not possess great bulk difficulty might be experienced in holding the same against turning when a screw driver is applied to the screw head 14 to effect removal of the screw. I, therefore, provide a notch or recess 17 in the nut 11 which may be engaged by any convenient tool and the nut may then be easily held against turning with the screw.

In Fig. 4, I have shown a slightly different embodiment of the invention. In this figure the faucet body 20 is of the same construction as the body 1 shown in Fig. 1. The shank 21 is threaded into the body in the same manner, but is equipped at its inner end with an annular axially extending flange or rim 22. The nut or base 23 of the valve fits within the rim or flange 22 and is guided thereby. In this embodiment of the invention the retaining screw 24 does not extend entirely through the nut but terminates short of the upper side thereof upon which is provided a stem in the form of a stud 25 having a smooth cylindrical surface and adapted to enter a socket 26 in a thimble 27 which is threaded into the lower end of the valve stem and upon its outer surface is provided with slots or notches 28 to receive the end of a screw driver or other turning tool. This arrangement of the parts will operate in precisely the same manner as the previously described form of the invention and may be preferred inasmuch as the stud 25 is much shorter than the spindle 15 and, consequently, a shorter thimble may be employed. Moreover, as the thimble is threaded into the lower end of the shank this form of the invention is better adapted to application to faucets now in use than the form previously described. It is to be understood that in both forms of the invention the thimble will be constructed of hard material so that it will possess wear-resisting qualities and thereby aid in prolonging the life of the parts.

In Fig. 5, I have illustrated an arrangement which is the same as that shown in Figs. 1 and 2, except that the thimble is omitted and a wear plate consisting of a disk 31 is substituted therefor, said disk having a central opening 32 to permit the engagement of the spindle 15 in the socket 7 and having its upper surface roughened as indicated at 33. The roughened surface of the wear plate will cause it to turn with the shank and the plate and valve should be of such relative diameters that the area of contact and of wear will be reduced to a minimum and be only of such extent as may be necessary to transmit the closing pressure of the shank to the valve. This form of the invention is advantageous inasmuch as a householder may purchase the valve with the spindle and wear plate and drop them in the faucet body without having any other change made in the faucet. A new faucet body is not needed nor is a new shank necessary and the services of a skilled mechanic are not required.

It will be readily understood that the spindle or stem rising from the valve is merely a centering device inasmuch as it is free and independent of the shank and the wear-resisting member and will not move either rotatably or longitudinally with the shank if the pressure within the valve body be withdrawn. If the pressure be not withdrawn the upward movement of the shank will permit the valve to rise under the influence of the pressure and the downward movement of the shank will cause the valve to be seated against the action of the pressure but in neither instance is the movement of the valve due to any connection between the same and the shank.

Having thus described my invention, what is claimed as new is:

1. In a faucet, the combination with a faucet body having a valve seat, and a shank rotatably mounted above the valve seat, of a wear-resisting thimble fitted in the lower end of the shank and having a convex lower surface, a valve comprising a nut, a washer bearing against the under face of the nut and a screw passing through the washer into the nut whereby to hold the washer against the nut, and a cylindrical member rising from the nut and fitting loosely in the wear-resisting thimble, whereby the valve will be centered relative to the shank and the latter may rotate about or move longitudinally of said cylindrical member without imparting movement to the valve.

2. In a faucet, the combination with a faucet body having a valve seat, and a shank mounted for rotary and axial movement in the body above the valve seat and provided with a cylindrical socket in its lower end, of a valve adapted to rest on the valve seat, and a cylindrical spindle rising from the valve to engage the socket in the shank and center the valve relatively to the shank and constructed at its upper end with notches to be engaged by a lifting tool, said spindle and the valve being independent of the shank whereby pressure by the shank upon the valve will seat the same but the shank may rotate about said spindle or move longitudinally thereof without imparting movement to the valve.

In testimony whereof I affix my signature.

MATTHEW S. REILEY. [L. S.]